(12) United States Patent
Tojima et al.

(10) Patent No.: US 9,507,360 B2
(45) Date of Patent: Nov. 29, 2016

(54) MINE POWER MANAGEMENT SYSTEM

(75) Inventors: Masanori Tojima, Fujisawa (JP); Kouichi Yamashita, Yokohama (JP); Tsugio Sudou, Tokyo (JP); Koji Takeda, Tama (JP); Takao Nagai, Yokohami (JP); Katsuhiro Kajino, Kawasaki (JP); Yasuhiro Yanagida, Kawasaki (JP); Yasuyuki Suzuki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 389 days.

(21) Appl. No.: 14/110,524

(22) PCT Filed: May 9, 2012

(86) PCT No.: PCT/JP2012/061826
§ 371 (c)(1),
(2), (4) Date: Oct. 8, 2013

(87) PCT Pub. No.: WO2012/153755
PCT Pub. Date: Nov. 15, 2012

(65) Prior Publication Data
US 2014/0032006 A1 Jan. 30, 2014

(30) Foreign Application Priority Data

May 10, 2011 (JP) .................. 2011-104938

(51) Int. Cl.
*G05F 1/66* (2006.01)
*B60M 3/06* (2006.01)
(Continued)

(52) U.S. Cl.
CPC ................. *G05F 1/66* (2013.01); *B60L 1/003* (2013.01); *B60L 3/0046* (2013.01); *B60L 3/04* (2013.01); *B60L 7/14* (2013.01); *B60L 9/08* (2013.01);
(Continued)

(58) Field of Classification Search
CPC ........... B60L 2200/40; B60L 2200/44; B60L 11/1801; B60L 7/10; B60L 3/0046; B60L 1/20; B60M 7/00; B60M 3/06; Y02T 90/128; Y10T 307/328; G05F 1/66
See application file for complete search history.

(56) References Cited

U.S. PATENT DOCUMENTS

| 4,471,231 A | 9/1984 | Minami |
| 5,351,775 A * | 10/1994 | Johnston .................. B60K 6/46 180/2.1 |
| 6,988,591 B2 | 1/2006 | Uranaka et al. |
| 7,641,043 B2 * | 1/2010 | Vestergaard ............. B64D 9/00 193/35 R |

(Continued)

FOREIGN PATENT DOCUMENTS

| CN | 1532083 A | 9/2004 |
| JP | 56-035604 A | 4/1981 |

(Continued)

OTHER PUBLICATIONS

Office Action dated Apr. 17, 2015, issued for the corresponding Canadian Patent Application No. 2,833,138.
(Continued)

*Primary Examiner* — Crystal J Barnes-Bullock
(74) *Attorney, Agent, or Firm* — Locke Lord LLP

(57) ABSTRACT

A mine power management system includes: a first power line provided at an ascent and configured to exchange electric power with an ascending vehicle traveling on the ascent; a second power line provided at a descent and configured to exchange electric power with a descending vehicle traveling on the descent; and a power supply and storage apparatus configured to exchange electric power at least between the first power line and the second power line.

20 Claims, 6 Drawing Sheets

(51) Int. Cl.

| | | |
|---|---|---|
| *B60M 7/00* | (2006.01) | |
| *E21F 17/06* | (2006.01) | |
| *B60L 9/08* | (2006.01) | |
| *B60L 11/12* | (2006.01) | |
| *G06Q 50/02* | (2012.01) | |
| *G06Q 50/06* | (2012.01) | |
| *H02J 4/00* | (2006.01) | |
| *B60L 1/00* | (2006.01) | |
| *B60L 3/00* | (2006.01) | |
| *B60L 3/04* | (2006.01) | |
| *B60L 7/14* | (2006.01) | |
| *B60L 11/00* | (2006.01) | |
| *B60L 15/20* | (2006.01) | |

(52) U.S. Cl.
 CPC ............ *B60L 11/005* (2013.01); *B60L 11/123* (2013.01); *B60L 11/126* (2013.01); *B60L 15/2009* (2013.01); *B60M 3/06* (2013.01); *B60M 7/00* (2013.01); *E21F 17/06* (2013.01); *G06Q 50/02* (2013.01); *G06Q 50/06* (2013.01); *H02J 4/00* (2013.01); *B60L 2200/40* (2013.01); *B60L 2210/40* (2013.01); *B60L 2240/12* (2013.01); *B60L 2240/34* (2013.01); *B60L 2240/40* (2013.01); *B60L 2240/421* (2013.01); *B60L 2240/622* (2013.01); *B60L 2250/16* (2013.01); *Y02T 10/6217* (2013.01); *Y02T 10/645* (2013.01); *Y02T 10/7022* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01); *Y02T 90/162* (2013.01); *Y10T 307/328* (2015.04)

(56) References Cited

U.S. PATENT DOCUMENTS

| | | | | |
|---|---|---|---|---|
| 7,832,126 | B2 * | 11/2010 | Koellner | E02F 3/304 37/348 |
| 8,174,225 | B2 * | 5/2012 | Mazumdar | E02F 9/207 318/433 |
| 8,550,007 | B2 * | 10/2013 | Mazumdar | B60L 7/10 104/289 |
| 8,550,008 | B2 * | 10/2013 | Mazumdar | B60L 7/10 104/289 |
| 8,583,303 | B2 * | 11/2013 | Bastien | E21F 13/00 701/22 |
| 8,893,830 | B2 * | 11/2014 | Ruth | B60L 5/36 180/2.1 |
| 2004/0225435 | A1 | 11/2004 | Ogawa et al. | |
| 2007/0185637 | A1 | 8/2007 | Ogawa et al. | |
| 2008/0282583 | A1 | 11/2008 | Koellner et al. | |
| 2010/0039054 | A1 * | 2/2010 | Young | B60L 11/08 318/376 |
| 2010/0289443 | A1 | 11/2010 | Mazumdar et al. | |
| 2011/0094841 | A1 | 4/2011 | Mazumdar et al. | |

FOREIGN PATENT DOCUMENTS

| | | |
|---|---|---|
| JP | 58-179228 U | 11/1983 |
| JP | 59-081232 A | 5/1984 |
| JP | 2000-299901 A | 10/2000 |
| JP | 2004-102322 A | 4/2004 |
| JP | 2004-289884 A | 10/2004 |
| JP | 2008-013992 A | 1/2008 |
| JP | 2010-142050 A | 6/2010 |
| WO | WO-2011/049661 A2 | 4/2011 |

OTHER PUBLICATIONS

International Search Report dated Jul. 31, 2012, issued for PCT/JP2012/061826.

* cited by examiner

MINE POWER MANAGEMENT SYSTEM

This is a U.S. National Phase Application under U.S.C. 371 of International Application No. PCT/JP2012/061826, filed on 9 May 2012, which claims priority to Japanese Application No. JP 2011-104938, filed on 10 May 2011.

FIELD

The present invention relates to a mine power management system that manages electric power consumed by machines for transportation and digging in a mine.

BACKGROUND

In a mine, work machines such as an excavator digs, dug ore is loaded on a dump track, which is a haulage vehicle, and the dump track carries the ore, which is a product, to a hopper in a processing facility. For example, Patent Document 1 describes a mine haulage system and a method for the purpose of improving a production amount in a mine.

CITATION LIST

Patent Literature

Patent Document 1: Japanese Patent Application Laid-open No. 2004-102322

SUMMARY

Technical Problem

Some of machines for use in the mine such as a dump track and a power shovel are operated with the supply of electric power. In the mine, since a large number of large-sized machines are used, electric power consumed by such machines using electric power becomes enormous. It is preferable to suppress power consumption in the mine also from the viewpoint of an environmental load. However, Patent Document 1 does not mention electric power management in the mine, and there is room for improvement. It is an object of the present invention to suppress power consumption in the mine.

Solution to Problem

According to the present invention, a mine power management system comprises: a first power line provided at an ascent and configured to exchange electric power with an ascending vehicle traveling on the ascent; a second power line provided at a descent and configured to exchange electric power with a descending vehicle traveling on the descent; and a power supply and storage apparatus configured to exchange electric power at least between the first power line and the second power line.

According to the present invention, the mine power management system further comprises an electric power control unit configured to control electric power allocation at least among a machine, the ascending vehicle, and the descending vehicle so that a total electric power consumed by the machine, the ascending vehicle, and the descending vehicle that exchange electric power with the power supply and storage apparatus is equal to or less than a total electric power generated by the machine, the ascending vehicle, and the descending vehicle.

According to the present invention, the electric power control unit controls the electric power allocation by adjusting allocation between the number of a plurality of the ascending vehicles and the number of a plurality of the descending vehicles.

According to the present invention, when the total electric power consumed by the machine, the ascending vehicle, and the descending vehicle is greater than the total electric power generated by the machine, the ascending vehicle, and the descending vehicle, the electric power control unit reduces at least one of power consumption of at least a part of a plurality of the ascending vehicles, power consumption of at least a part of a plurality of the descending vehicles, and power consumption of at least a part of a plurality of the machines.

According to the present invention, the electric power control unit reduces at least one of the power consumption of the machines, the power consumption of the ascending vehicles, and the power consumption of the descending vehicles in order of lower priority levels.

According to the present invention, when the total electric power consumed by the machine, the ascending vehicle, and the descending vehicle is greater than the total electric power generated by the machine, the ascending vehicle, and the descending vehicle, the electric power control unit supplies a shortage in the electric power from the power supply and storage apparatus.

According to the present invention, when the descending vehicle includes a generator, the electric power control unit supplies a shortage in the electric power from the generator of the descending vehicle when the total electric power consumed by the machine, the ascending vehicle, and the descending vehicle is greater than the total electric power generated by the machine, the ascending vehicle, and the descending vehicle.

According to the present invention, a sum total of heights of a plurality of the ascents where the first power line is provided and a sum total of heights of a plurality of the descents where the second power line is provided are within ±10% with respect to an average value of the sum totals.

According to the present invention, a sum total of heights of a plurality of the descents where the second power line is provided is greater than a sum total of heights of a plurality of the ascents where the first power line is provided.

The present invention can suppress power consumption in a mine.

DESCRIPTION OF EMBODIMENT

A mode (an embodiment) for carrying out the present invention will be described in detail with reference to the drawings. The present invention is not limited to the content described in the embodiment below. Moreover, components described below include ones that can be easily conceived by a person in the art and substantially equivalent ones. Furthermore, components described below can be appropriately combined with each other. In addition, components can be variously omitted, replaced, or modified within the scope not deviating from the teachings of the present invention.

<Mine Power Management System>

Figure 1:
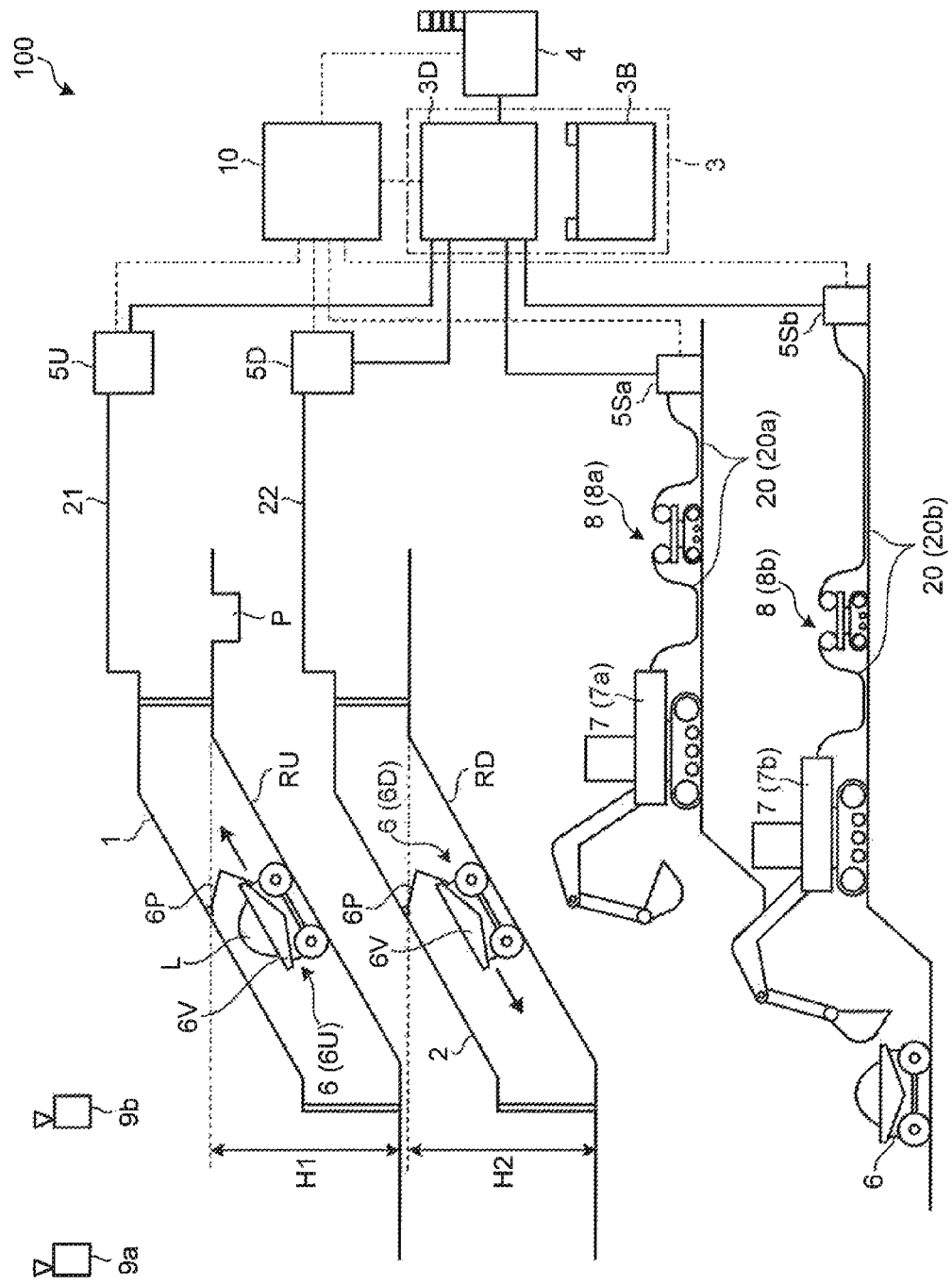
FIG. 1 is a configuration diagram of a mine power management system according to an embodiment.

FIG. 1 is a block diagram of a mine power management system according to an embodiment. A mine power management system 100 includes a first power line 1, a second power line 2, and a power supply and storage apparatus 3. The first power line 1 is provided at an ascent RU, and exchanges electric power with an ascending vehicle 6U traveling on the ascent RU. The second power line 2 is provided at a descent RD, and exchanges electric power with a descending vehicle 6D traveling on a descent RD. The power supply and storage apparatus 3 exchanges electric power at least between the first power line 1 and the second power line 2. In the following, the ascending vehicle 6U is a vehicle traveling on the ascent RU, and the descending vehicle 6D is a vehicle traveling on the descent RD. In a case where the ascending vehicle 6U is not discriminated with the descending vehicle 6D, the vehicles are simply referred to as vehicles 6.

The vehicle 6 is a dump track, which is one of haulage vehicles, for example, and loads and transports mined ore or earth and sand, rocks, or the like produced in mining as a load L on a vessel 6V. The vessel 6V is a container (a carriage) on which the load L is loaded. It is noted that the vehicle 6 is not limited to a dump track, and is a vehicle that travels using external electric power and using electric power obtained through its internal combustion engine or the like. Since the vehicle 6 is a machine (a mine machine) used in a mine, the vehicle 6 travels on an unpaved road. Although the structure of the vehicle 6 will be described later, the vehicle 6 can travel by driving a motor with electric power obtained by driving a generator using an internal combustion engine as well as can travel by similarly driving the motor with the supply of electric power from the power supply and storage apparatus 3. The vehicle 6 includes a current collector 6P for the supply of electric power from the power supply and storage apparatus 3.

In the mine, machines 7a, 7b, and the like are operated in addition to the vehicle 6. In the embodiment, the machines (the mine machines) 7a and 7b are power-driven excavators that are loading machines to load ore or the like on the dump track. A machine 7 is a machine operated using external electric power. In the embodiment, the machines 7a and 7b are also operated using electric power with the supply of electric power from the power supply and storage apparatus 3. The machines 7a and 7b are supplied with electric power from the power supply and storage apparatus 3 through power supply cables 20a and 20b included in power supply relay vehicles 8a and 8b. It is noted that in the embodiment, the power supply relay vehicles 8a and 8b may not be used. In the following, the machines 7a and 7b, the power supply relay vehicles 8a and 8b, or the power supply cables 20a and 20b are simply referred to as machines 7, power supply relay vehicles 8, or power supply cables 20, in a case where it is unnecessary to discriminate between them.

The power supply and storage apparatus 3 includes an electric power supply device 3D and a storage device 3B. The electric power supply device 3D transforms or rectifies alternating-current power transmitted from a power plant 4 to allocate the alternating-current power to a plurality of breakers 5U, 5D, 5Sa, and 5Sb. In a case where the vehicle 6, the machine 7, and the like use direct current power, the electric power supply device 3D includes a transformer and a rectifier. In a case where the vehicle 6, the machine 7, and the like use alternating-current power, the electric power supply device 3D may not include a rectifier while including a transformer.

In the mine power management system 100, the sum of electric power generated by the regeneration of the vehicles 6 or the machines 7 and electric power transmitted from the power plant 4 is sometimes greater than electric power consumed by the vehicles 6 and the machines 7. In this case, excess electric power is produced. However, the storage device 3B stores this excess electric power. Moreover, electric power consumed by the vehicles 6 and the machines 7 is sometimes greater than the sun of electric power generated by the regeneration of the vehicles 6 or the machines 7 and electric power transmitted from the power plant 4. In this case, electric power shortage occurs. However, the storage device 3B complements electric power shortage by discharging. In this manner, the mine power management system 100 can flexibly meet a changing electric power demand. Furthermore, although it is difficult for the power plant 4 to follow a sudden load change, the mine power management system 100 includes the storage device 3B, so that the mine rower management system 100 can meet a change even though an electric power demand in the mine is suddenly changed. For example, a rechargeable battery, en electric double layer capacitor, or the like can be used for the storage device 3B. It is noted that in addition to the storage device 3B, the vehicle 6 and the machine 7 may also include a device to store electric power such as a rechargeable battery and an electric double layer capacitor, for example). The device to store electric power may store electric power with the supply of excess electric power from the first power line 1 or the second power line 2. With this configuration, the size (dimensions or capacity) of the storage device 3B can be reduced, so that such advantages are exerted that manufacturing costs of the mine power management system 100 are suppressed and the degree of freedom of the installation space for the storage device 3B is improved.

In the embodiment, the mine power management system 100, more specifically, the power supply and storage apparatus 3 includes the power plant 4. Namely, the power plant 4 is constructed in the mine. However, the power supply and storage apparatus 3 may be supplied with electric power through a power transmission line from the power plant 4 at a location apart from the mine. Namely, the mine power management system 100 may not include the power plant 4.

The breakers 5U, 5D, 5Sa, and 5Sb are switches that switch on and off a load current in the normal operation of a power circuit and a power device and that break an accident current such as a short-circuit current in cooperation with a protective relay. The breaker 5U is connected to the first power line 1 through a transmission line 21, and the breaker 5D is connected to the second power line 2 through a transmission line 22. The breaker 5Sa is connected to the power supply cable 20a of the power supply relay vehicle 8a, and the breaker 5Sb is connected to the power supply cable 20b of the power supply relay vehicle 8b. With this structure, the first power line 1, the second power line 2, and the power supply relay vehicles 8a and 8b can exchange electric power with the power supply and storage apparatus 3. Moreover, the first power line 1 and the second power line 2 are connected to the machines 7a and 7b through the power supply and storage apparatus 3.

The mine power management system 100 includes a management apparatus 10. The management apparatus 10 performs power management in the mine as well as operation schedule management, management of the vehicles 6 and the machines 7 such as operation status, and production management, for example. The management apparatus 10 is a computer, for example, that executes various management programs for the managements described above, collects information from the vehicles 6, the machines 7, and the power supply and storage apparatus 3, and the like in cooperation with a communication device, or control them. In a case where the mine power management system 100 includes the power plant 4, the management apparatus 10 manages the operation status of the power plant 4, or controls the power plant 4. It is noted that the management apparatus 10 may not manage the operation status of the power plant 4 or control the power plant 4 in some cases (for example, in a case where the management organization of the mine is different from the management organization of the power plant 4). Namely, in the embodiment, the management apparatus 10 may not manage the operation status of the power plant 4 and control the power plant 4.

The vehicle 6 and the machine 7 include a function that receives radio waves from GPS (Global Positioning System) satellites 9a and 9b to grasp their positions. The positions of the vehicle 6 and the machine 7 grasped by the vehicle 6 and the machine 7 are sent to the management apparatus 10, and used for controlling or managing the vehicle 6 and the machine 7. It is noted that in the embodiment, the vehicle 6 and the machine 7 are unattended devices, and the operations are controlled by the management apparatus 10. However, the mine power management system 100 is applicable not only to the vehicle 6 and the machine 7 operated in an unattended manner but also to the vehicle 6 and the machine 7 operated by the manipulation of operators. Moreover, in the embodiment, the mine power management system 100 is also applicable to a case where the vehicle 6 and the machine 7 operated in an unattended manner are combined with the vehicle 6 and the machine 7 operated by manipulations of operators. Next, the vehicle 6 and the machine 7 will be described.

<Vehicle>

Figure 2:
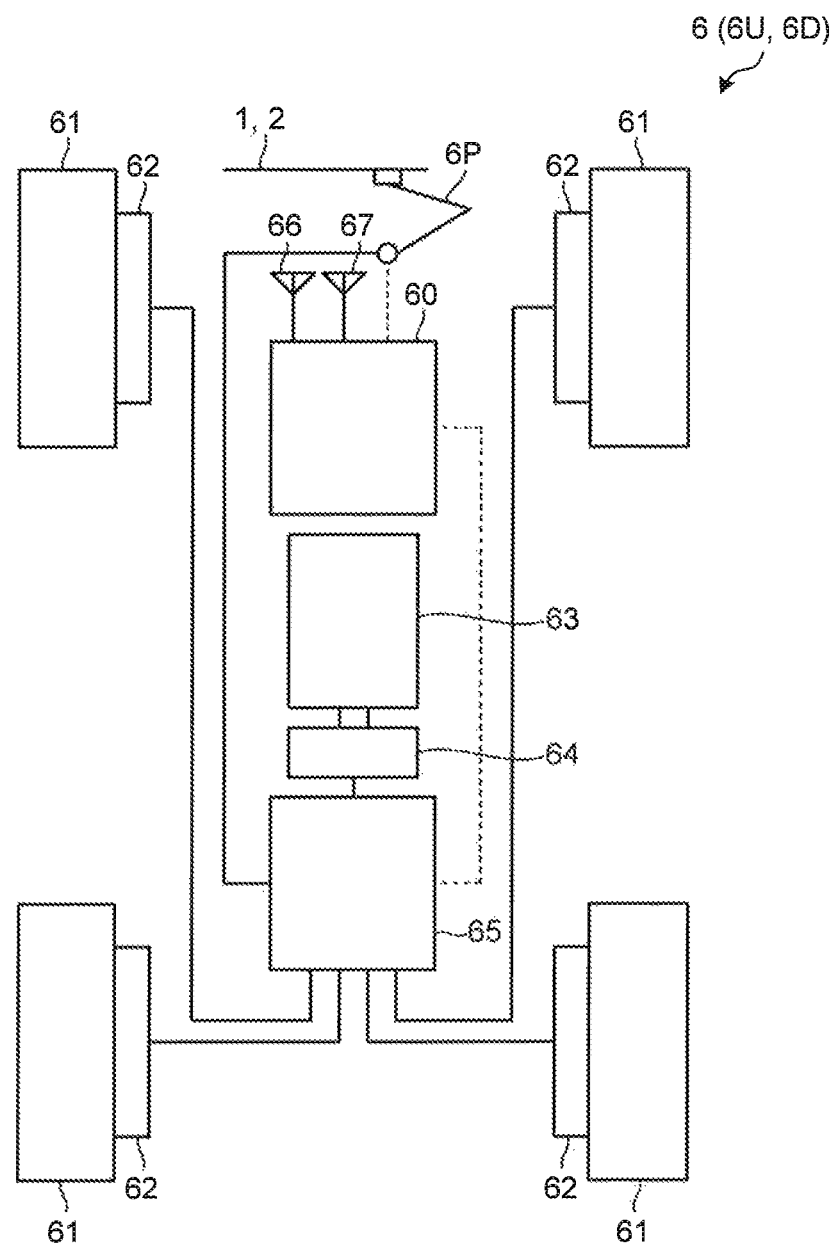
FIG. 2 is a schematic diagram of an exemplary configuration of a vehicle.

FIG. 2 is a schematic diagram of an exemplary configuration of a vehicle. As described above, the vehicle 6 is a dump track. The vehicle 6 includes a vehicle controller 60, a plurality of wheels 61 (four wheels 61 in the embodiment), motors 62 that individually drive the wheels 61, an internal combustion engine 63, a generator 64, a motor controller 65, a wireless communication antenna 66, a GPS antenna 67, the current collector 6P, and the vessel 6V illustrated in FIG. 1.

The drive type of the vehicle 6 is a so-called in-wheel motor type in which the motor 62 is disposed on the inner radius side of the wheel 61. However, the drive type is not limited to the in-wheel motor type. Moreover, the vehicle 6 includes the motors 62 for all the wheels 61. However, the motor 62 may be provided only on two rear wheels or on two front wheels, for example. The vehicle 6 has at least two steering wheels among four wheels 61, and all the wheels 61 may be steering wheels. The motors 62 are individually driven by electric power generated from the generator 64 driven by the internal combustion engine 63.

Electric power (alternating-current power) generated by the generator 64 is inputted to the motor controller 65 including an inverter, and then supplied to a plurality of the motors 62 for driving the motors 62. The vehicle controller 60 controls the motor controller 65 to control the drive or the regeneration of the motors 62. The motor controller 65 is also connected to the current collector 6P. It is also possible that the motor controller 65 is supplied with electric power from the first power line 1 or the second power line 2 through the current collector 6P to drive the motor 62. Moreover, the motor 62 is used as a generator in a case where the vehicle 6 is to be braked, so that the motor 62 can generate (regenerate) electric power while braking the vehicle 6. Electric power generated at this time is returned to the second power line 2 or the first power line 1 through the motor controller 65 and the current collector 6P. Electric power returned to the second power line 2 is supplied to the first power line 1 or the second power line 2 through the power supply and storage apparatus 3, for example. As described above, since the first power line 1 is provided at the ascent RU and the second power line 2 is provided at the descent RD, the vehicle 6 does not exchange electric power simultaneously with the first power line 1 and the second power line 2.

The first power line 1 is provided at the ascent RU to supply electric power mainly to the ascending vehicle 6U. However, the first power line 1 is sometimes supplied with electric power generated by the regeneration of the ascending vehicle 6U. Moreover, the second power line 2 is provided at the descent RD, and mainly supplied with electric power generated by the regeneration of the descending vehicle 6D. However, the second power line 2 sometimes supplies electric power to the descending vehicle 6D. As described above, both of the first power line 1 and the second power line 2 can supply electric power to the vehicle 6 as well as can be supplied with electric power from the vehicle 6.

The vehicle controller 60 drives the motor 62 with electric power from the first power line 1, or drives the motor 62 with electric power obtained from the internal combustion engine 63 driving the generator 64. Furthermore, the vehicle controller 60 exchanges information with the management apparatus 10 illustrated in FIG. 1 through the wireless communication antenna 66.

In controlling the motor 62, the vehicle controller 60 finds its position from radio waves from the GPS satellites 9a and 9b obtained through the GPS antenna 67, for example, and raises the current collector 6P when the vehicle 6 reaches the position of the first power line 1 on the ascent RD. The vehicle controller 60 then contacts the current collector 62 with the first power line 1, drives the motor 62 with the supply of electric power, and stops the internal combustion engine 63.

<Machine>

Figure 3:
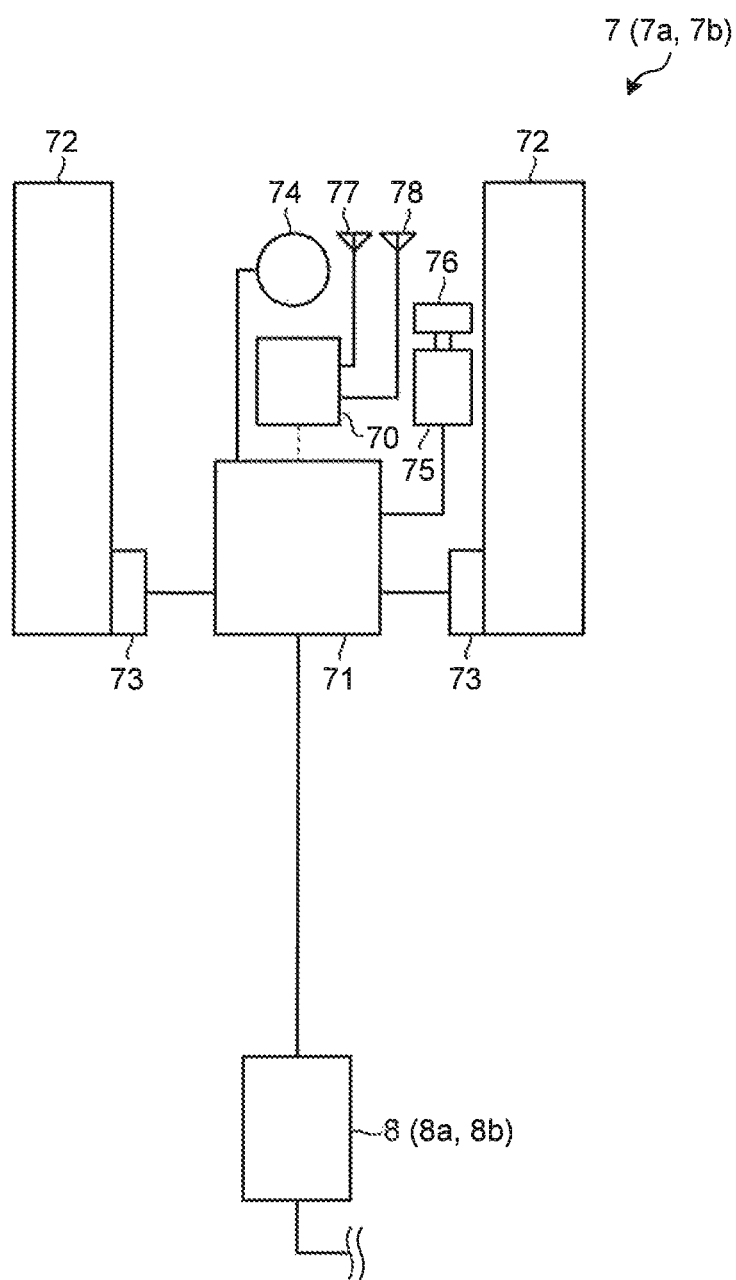
FIG. 3 is a schematic diagram of an exemplary configuration of a machine.

FIG. 3 is a schematic diagram of an exemplary configuration of a machine. As described above, the machine 7 is a power-driven power shovel. The machine 7 includes a machine controller 70, a motor controller 71, a pair of crawler belts 72, two travel motors 73, a swing motor 74, a hydraulic pressure generation motor 75, a hydraulic pump 76, the wireless communication antenna 77, and the GPS antenna 78.

The machine 7 travels by driving the individual crawler belts 72 using two travel motors 73. Moreover, the swing motor 74 swings the upper swing body of the machine 7. The hydraulic pressure generation motor 75 drives the hydraulic pump 76 to generate a hydraulic pressure necessary to drive a work machine (a device including a boom, an arm, and a bucket) included in the machine 7. The motor controller 71 is supplied with electric power from the power supply and storage apparatus 3 illustrated in FIG. 1 through the power supply relay vehicle 8. The motor controller 71 then supplies electric power to the travel motor 73, the swing motor 74, and the hydraulic pressure generation motor 75 by an instruction from the machine controller 70 for driving them.

The machine controller 70 controls the motor controller 71 to control the drive or the regeneration of the travel motor 73, the swing motor 74, and the hydraulic pressure generation motor 75. The travel motor 73 and the swing motor 74 generate (regenerate) electric power by braking the machine 7 and stopping the upper swing body included in the machine 7. The machine controller 70 controls the motor controller 65 to return electric power generated by the travel motor 73 and the swing motor 74 to the power supply and storage apparatus 3 through the power supply relay vehicle 8. Furthermore, the machine controller 70 exchanges information with the management apparatus 10 illustrated in FIG. 1 through a wireless communication antenna 77, or finds its position from radio waves from the GPS satellites 9a and 9b obtained through the GPS antenna 67, and sends the position to the management apparatus 10.

In the embodiment, the components of the machine 7 driven by the motor are not limited to one described above. For example, the machine 7 may use the motor only for driving the crawler belts 72, may use the motor only for driving the work machine, or may use the motor only for swinging the upper swing body. Moreover, the machine 7 may use the motor only for driving at least one of the crawler belts 72, the work machine, and the upper swing body. For example, in a case where the motor is used for driving the work machine, the motor is driven when the boom is lowered, and then electric power can be generated.

<Operation of the Vehicle and the Machine>

Generally, in the mine, a mining site is often located at the bottom of a hole produced by digging for mining ore. Thus, the load L such as ore or earth and sand is loaded on the vessel 6V of the vehicle 6 at the bottom of the hole. The vehicle 6 having the load L loaded on the vessel 67 then travels on the ascent RU toward the exit of the hole. Namely, the ascending vehicle 6U is generally in the state in which the load is loaded on the vessel 6V. When the ascending vehicle 6U travels to a hopper P located at the upper part of the ascent RU, the ascending vehicle 6U raises one end of the vessels 6V to throw the load L loaded on the vessel 6V into the hopper P.

The vehicle 6 transporting the load L has the largest load when traveling on the hill RU. Namely, the ascending vehicle 6U loaded with the load L has the largest energy for use in traveling. Thus, when the ascending vehicle 6U travels on the ascent RU, the ascending vehicle 6U raises and contacts the current collector 6P with the First power line 1 provided at the ascent RU for the supply of electric power from the power supply and storage apparatus 3 through the first power line 1. With this configuration, the ascending vehicle 6U can be supplied with a sufficient amount of electric power from the power supply and storage apparatus 3, so that the ascending vehicle 6U can reliably climb up the ascent RU even in the state in which the load L is loaded. It is noted that when the ascending vehicle 6U travels on the ascent RD, the ascending vehicle 6U may use electric power generated by the internal combustion engine 63 and the generator 64 in combination, or may stop the internal combustion engine 63.

It is noted that in the embodiment, the ascending vehicle 6U travels on the ascent RU as the current collector 6P is placed toward the front, that is, the current collector 6P is directed in the traveling direction side. In a case where the load L is dropped from the vessel 6V, the load L is dropped on the rear side, that is, in the direction opposite to the traveling direction. The current collector 6P is placed toward the front when the current collector 6P is used, so that, such an event can be avoided that the load L dropped from the vessel 6V collides against the current collector 6P. As a result, a problem caused on the current collector 6P can be suppressed.

After throwing the load L into the hopper P, the vehicle 6 has an empty vessel 6V, and travels on the descent RD to go to the mining site of ore. The vehicle 6 traveling on the descent RD, that is, the descending vehicle 6D travels in the state in which the current collector 6P contacts the second power line 2. When the descending vehicle 6D travels on the descent RU, the potential energy of the descending vehicle 6D is converted into kinetic energy. In the mine power management system 100, the descending vehicle 6D uses the motor 62 as a generator, and generates (regenerates) electric power using kinetic energy into which potential energy is converted. With this configuration, the motor 62 of the descending vehicle 6D generates electric power as well as brakes the descending vehicle 6U. Electric power generated by the motor 62 is returned to the second power line 2, and supplied from the first power line 1 to the ascending vehicle 6U through the power supply and storage apparatus 3, or stored in the power supply and storage apparatus 3. As described above, in the mine power management system 100, the second power line 2 is provided at the descent RD, and the motor 62 is caused to regenerate electric power using kinetic energy when the descending vehicle 6D travels, so that electric power consumed by all of the vehicles 6 and the machines 7 can be greatly reduced from the viewpoint of all of the vehicles 6 and the machines 7 operated in the mine. As a result, the mine power management system 100 can suppress power consumption in the mine.

Moreover, the travel motor 73 and the swing motor 74 generate electric power also in the machine 7. The electric power is returned to the power supply and storage apparatus 3 through the power supply relay vehicle 8 and stored in the storage device 3B, or supplied to the first power line 1. Thus, the mine power management system 100 can also effectively use electric power generated by the machine 7, so that electric power consumed by all of the vehicles 6 and the machines 7 operated in the mine can be greatly reduced.

In the mine power management system 100, preferably, a sum total H1$s$ of the height of the ascents RU and a sum total H2$s$ of the height of the descents RD are within □10% with respect to an average value Hav=((H1$s$ □ H2$s$)/2) of the sum totals, more preferably, within □5%, and much more preferably, the sum totals are equal. The sum total of the height of the ascents RU is a product of a number n (a natural number) of the ascents where the first power line 1 is provided and a height H1 (n×H1). The sum total of the height of the descents RD is a product of a number m (a natural number) of the descents where the second power line 1 is provided and a height H1 (m×H2). Namely, preferably, H1$s$/Hav and H2$s$/Hav are 0.9 or more and 1.1 or less, more preferably, 0.95 or more and 1.05 or less, and much more preferably, one. H1$s$/Hav and H2$s$/Hav are set in the ranges as described above, so that electric power from the descending vehicles 6D can be allocated to the first power lines 1 in a good balance. Thus, the allocation of the vehicles 6 for electric power allocation, described later, is facilitated.

It is noted that the sum total H2$s$ of the height of the descents RD may be greater than the sum total H1$s$ of the height of the ascents RU. Since the descending vehicle 6D is not loaded with the load L, the potential energy of the descending vehicle 6D is smaller than that of the ascending vehicle 6U in the same height. Therefore, the sum total H2$s$ of the height of the descents RD is made greater than the sum total H1s of the height of the ascents RU, so that the number of the descending vehicles 6D traveling on the descent RD can be made greater than the number of the ascending vehicles 6U traveling on the ascent RU. As a result, the mine power management system 100 can further increase electric power generated by the descending vehicles 6U, so that electric power necessary for the ascending vehicles 6U is easily supplied.

Particularly, in the mine, the total number of the vehicles 6 operated is not changed so greatly, and the vehicles 6 and the machines 7 are operated according to a production plan planned in advance. Thus, in the mine, a demand for electric power is easily predicted. Moreover, since the management apparatus 10 manages the operation status and the allocation of the vehicles 6 in the mine power management system 100, the ratio between the ascending vehicles 6U traveling on the ascent RU with the load L loaded and the descending vehicles 6D traveling on the descent RD is adjusted, so that the balance between electric power consumed by the vehicles 6 and the supply of electric power is easily adjusted. Next, the functions of the mine power management system 100 and an example of control on electric power allocation according to the embodiment will be described.

<Functions of Mine Power Management System>

Figure 4:
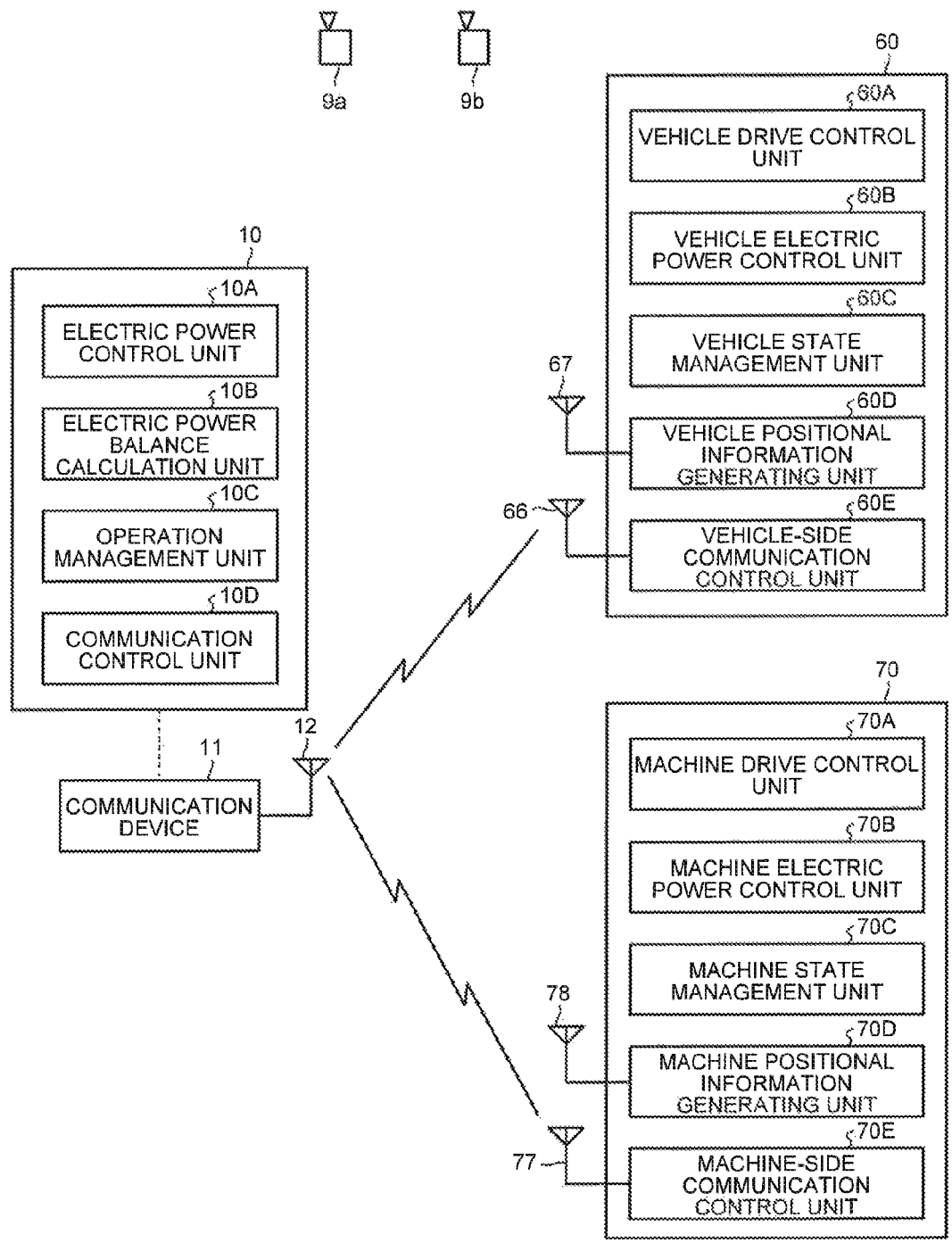
FIG. 4 is a functional block diagram illustrating the functions of the mine power management system according to the embodiment.

FIG. 4 is a functional block diagram illustrating the functions of the mine power management system according to the embodiment. The processes of the mine power management system 100 are implemented by the management apparatus 10, the vehicle controller 60 included in the vehicle 6 illustrated in FIGS. 1 and 2, and the machine controller 70 included in the machine 7 illustrated in FIGS. 1 and 3. The management apparatus 10 includes an electric power control unit 10A, an electric power balance calculation unit 10B, an operation management unit 10C, and a communication control unit 10D. These functions are implemented by executing a computer program that implements the functions of the electric power control unit 10A and the like by the management apparatus 10, which is a computer. It is noted that the electric power control unit 10A and the like may be configured of hardware.

The electric power control unit 10A controls electric power allocation at least between the machines 7, the ascending vehicles 6U, and the descending vehicles 6D in such a way that the total electric power consumed by the machines 7, the ascending vehicles 6U, and the descending vehicles 6D that exchange electric power with the power supply and storage apparatus 3 is not greater than the total electric power generated by the machines 7, the ascending vehicles 6U, and the descending vehicles 6D. The electric power balance calculation unit 10B calculates an electric power balance in the mine power management system 100. For example, the electric bower balance calculation unit 10B calculates an electric power balance (a mine machine electric power balance) between the total electric power consumed by the machines 7, the ascending vehicles 6U, and the descending vehicles 6D that exchange electric power with the power supply and storage apparatus 3 and the total electric power generated by the machines 7, the ascending vehicles 6U, and the descending vehicles 6D.

Moreover, the electric power balance calculation unit 10B calculates the balance between supplied electric power and consumed electric power as an electric power balance in which electric power supplied from the power supply and storage apparatus 3 and electric power generated by the machines 7, the descending vehicles 6D, and the like are considered to be supplied electric power and electric power consumed by the machines 7, the ascending vehicles 6U, and the like that do not generate electric power is considered to be consumed electric power. Since excess electric power is produced in a case where supplied electric power is greater than consumed power, the electric power control unit 10A stores the excess electric power in the storage device 3, reduces electric power supply from the power plant 4, or increases electric power supply from the first power line 1. In a case where electric power supply from the first power line 1 is increased, when there is the ascending vehicle 6U also using electric power generated by the internal combustion engine 63, for example, the electric power control unit 10A stops the internal combustion engine 63, and all energy necessary for traveling is electric power supplied from the first power line 1.

In a case where the vehicle 6 is operated by an operator, that is, in a case where the vehicle 6 is a manned vehicle, such a configuration may be possible in which for stopping the internal combustion engine 63, the electric power control unit 10A displays a message that the internal combustion engine 63 is to be stopped on a display device provided on a manipulation panel in the vehicle 6, for example, and instructs the operator of the vehicle 6 to stop the internal combustion engine 63. Moreover, such a configuration may be possible in which for stopping the internal combustion engine 63 of a manned vehicle, the electric power control unit 10A automatically stops the internal combustion engine 63, and displays a message on the display device that the internal combustion engine 63 is stopped.

Since electric power is necessary when consumed electric power is greater than supplied electric power, the electric power control unit 10A causes the storage device 3 to supply electric power by a shortage, increases electric power supplied from the power plant 4, or increases electric power supply from the second power line 2. In a case of increasing electric power supply from the second power line 2, the electric power control unit 10A allocates the vehicles 6 in such a way that a larger number of the vehicles 6 travel on the descent RD, for example. Moreover, the descending vehicle 6D traveling on the descent RD generally stops the internal combustion engine 63. For example, such a configuration may be possible in which the electric power control unit 10A operates the internal combustion engine 63 of the descending vehicle 6D, which stops the internal combustion engine 63, to drive the generator 64 for generating electric power, and supplies the electric power to the second power line 2 together with electric power obtained, by the regeneration of the motor 62.

In a case of restarting the operation of the internal combustion engine 63 of a manned vehicle, such a configuration may be possible in which the electric power control unit 10A displays a message on the display device provided on the manipulation panel in the vehicle 6 that the internal combustion engine 63 is to be operated to generate electric power generation and the obtained electric power is to be supplied to the second power line 2, for example, and the operator of the vehicle 6 is instructed to generate electric power by the internal combustion engine 63. Furthermore, for generating electric power by the internal combustion engine 63 of a manned vehicle, such a configuration may be possible in which the electric power control unit 10A automatically operates the internal combustion engine 63 to start electric power generation, and displays a message on the display device that the operation of the internal combustion engine 63 is started and the supply of electric power to the second power line 2 is started.

In a case where electric power necessary in the mine is short, the electric power control unit 10A suppresses the amount of electric power consumed by allocating the vehicles 6 so as to reduce the number of the ascending vehicles 6U traveling on the ascent RU, or by reducing the speed of the ascending vehicle 6U traveling. In this case, such a configuration may be possible in which the electric power control unit 10A drives the generator 64 of the ascending vehicle 6U traveling on the ascent RU in the state in which the internal combustion engine 63 is stopped by operating the internal combustion engine 63 and causes the ascending vehicle 6U to travel also using electric power from the generator 64.

The operation management unit 10C manages the production plan in the mine, manages the operation status of the vehicles 6 and the machines 7 and the schedule of the maintenance and service of the vehicles 6 and the machines 7, manages the fueling timing of the vehicles 6, or manages the operation status of operators. The communication control unit 10D communicates with the vehicle controller 60 of the vehicle 6 and the machine controller 70 of the machine 7 through a communication device 11 for exchanging information with each other. For information sent from the communication control unit 10D to the vehicle controller 60, there are instructions to raise and lower the current collector 6P of the vehicle 6, and instructions to operate or stop the internal combustion engine 63 and the like, for example. For information sent to the machine controller 70 of the machine 7, there are instructions to start or stop operation and the like, for example. For information sent from the vehicle controller 60 of the vehicle 6 or the machine controller 70 of the machine 7 to the communication control unit 10D, the positional information about the vehicle 6 or the positional information about the machine 7, information about consumed electric power, information about electric power obtained by regeneration, and the like, for example.

The vehicle controller 60 is a computer, for example, and includes a vehicle drive control unit 60A, a vehicle electric power control unit 60B, a vehicle state management unit 60C, a vehicle positional information generating unit 60D, and a vehicle-side communication control unit 60E. These functions are implemented by executing a computer program to implement the functions of the vehicle drive control unit 60A and the like by the vehicle controller 60. It is noted that the vehicle drive control unit 60A and the like may be configured of hardware.

The vehicle drive control unit 60A controls the outputs of the motor 62, the internal combustion engine 63, and the like of the vehicle 6. The vehicle electric power control unit 60B calculates electric power consumed by the vehicle 6 and electric power generated by the vehicle 6, that is, electric power obtained by the regeneration of the motor 62, or operates or stops the internal combustion engine 63 or raises and lowers the current collector 6P based on an instructions from the electric power control unit 10A of the management apparatus 10. The vehicle state management unit 60C acquires the state of the vehicle 6 from various sensors provided on the vehicle 6, and sends the state to the management apparatus 10. The vehicle positional information generating unit 60D grasps its position from radio waves from the GPS satellites 9a and 9b received at the GPS antenna 67, and sends the position to the management apparatus 10. It is noted that such a configuration may be possible in which a signal transmitter or the like is disposed on a traveling route of the vehicle 6, and the vehicle positional information generating unit 60D acquires signals emitted from the signal transmitter to generate positional information (in the following, the same configuration is applied). The vehicle-side communication control unit 60E communicates with the communication control unit 11D of the management apparatus 10 through the wireless communication antenna 66, and the wireless communication antenna 12 and the communication device 11 included in the communication device 11 of the management apparatus 10.

The machine controller 70 is a computer, for example, and includes a machine drive control unit 70A, a machine electric power control unit 70B, a machine state management unit 70C, a machine positional information generating unit 70D, and a machine-side communication control unit 70E. These functions are implemented by executing a computer program to implement the functions of the machine drive control unit 70A and the like by the machine controller 70, it is noted that the machine drive control unit 70A and the like may be configured of hardware.

The machine drive control unit 70A controls the outputs of the travel motor 73, the swing motor 74, the hydraulic pressure generation motor 75, and the like of the machine 7. The machine electric power control unit 70B calculates electric power consumed by the machine 7 and electric power generated by the machine 7, that is, electric power obtained by the regeneration of the travel motor 73 and the swing motor 74, or operates or stops the machine 7 based on an instruction from the electric power control unit 10A of the management apparatus 10. The machine state management unit 70C acquires the state of the machine 7 from various sensors provided on the machine 7, and sends the state to the management apparatus 10. The machine positional information generating unit 70D grasps its position from radio waves from the GPS satellites 9a and 9b received at a GPS antenna 78, and sends the position to the management apparatus 10. The machine-side communication control unit 70E communicates with the communication control unit 11D of the management apparatus 10 through the wireless communication antenna 77, and the wireless communication antenna 12 and the communication device 11 included in the communication device 11 of the management apparatus 10.

In the embodiment the management apparatus 10 exchanges information with the vehicle controller 60 and the machine controller 70 by direct wireless communications. However, communications among the management apparatus 10 and the vehicle controller 60 and the machine controller 70 are not limited to this manner. Next, an example of control on electric power allocation executed by the mine power management system 100 will be described.

<Control on Electric Power Allocation>

Figure 5:
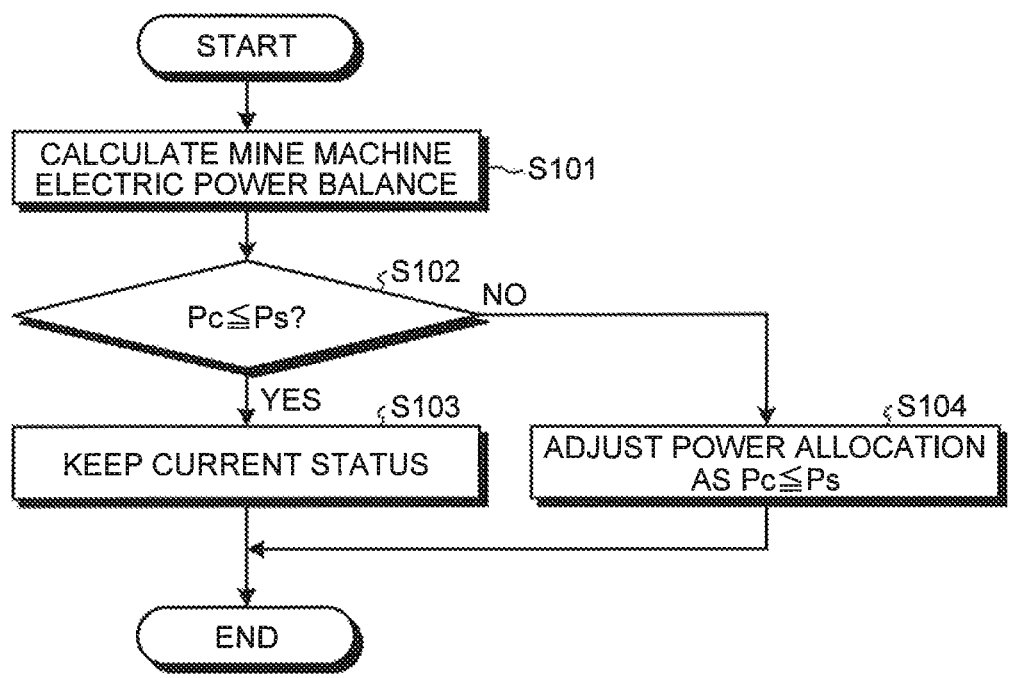
FIG. 5 is a flowchart of an example of control on electric power allocation.

FIG. 5 is a flowchart of an example of control on electric power allocation. First, in Step S101, the electric power balance calculation unit 10B of the management apparatus 10 calculates the mine machine electric power balance described above. Namely, in Step S101, the electric power balance between a total electric power (a total electric power consumed) Pc consumed by the machines 7, the ascending vehicles 6U, and the descending vehicles 6D and a total electric power (a total electric power generated) Ps generated by the machines 7, the ascending vehicles 6U, and the descending vehicles 6D is calculated.

Subsequently, the management apparatus 10 advances the process to Step S102. In Step S102, in a case where the total electric power generated Ps is the total electric power consumed Pc or more (Yes in Step S102) as a result of calculating the electric power balance in Step S101, the management apparatus 10 advances the process to Step S103. In Step S103, the electric power control unit 10A included in the management apparatus 10 keeps the current status for the use state of the vehicles 6, the state of the allocation of the vehicles, and the use state of the machines 7. This is because electric power consumed by the machines 7 and the ascending vehicles 6U is within the range of electric power generated by the machines 7 and the descending vehicles 6D. In a case where the total electric power generated Ps is greater than the total electric power consumed Pc, since excess electric power is produced in the mine, the electric power control unit 10A may store excess electric power in the storage device 3B, or reduce the output of the power plant 4.

In Step S102, in a case where the total electric power generated Ps is smaller than the total electric power consumed Pc (No in Step S102), electric power consumed by the machines 7 and the ascending vehicles 6U exceeds the range of electric power generated by the machines 7 and the descending vehicles 6D. Thus, the management apparatus 10 advances the process to Step S104, and the electric power control unit 10A adjusts electric power allocation in such a way that the total electric power generated Ps is the total electric power consumed Pc or more. In this case, for example, the electric power control unit 10A sets Pc≤Ps by controlling electric power allocation between at least the machines 7, the ascending vehicles 6U, and the descending vehicles 6D. In the mine, the machines 7 and the ascending vehicles 6U mostly consume electric power. Moreover, electric power generated by the descending vehicles 6D and the machines 7 occupies electric power obtained in the mine except the power plant 4 at a large rate. Furthermore, it is difficult for the power plant 4 to follow a sudden load change. Thus, the electric power control unit 10A adjusts electric power allocation between at least the machines 7, the ascending vehicles 6U, and the descending vehicles 6D, so that the electric tower control unit 10A can quickly and relatively easily set Pc≤Ps.

For a scheme of controlling electric power allocation among the machines 7, the ascending vehicles 6U, and the descending vehicles 6D, there is a scheme in which the allocation of the number of the ascending vehicles 6U and the number of the descending vehicles 6D is adjusted, for example. More specifically, the electric power control unit 10A increases the number of the descending vehicles 6D more than the number of the ascending vehicles 6U, so that the electric power control unit 10A increases electric power generated by the descending vehicles 6D (that is, the electric power control unit 10A increases the total electric power generated Ps) to set Pc≤Ps. With this configuration, Pc≤Ps can be relatively easily set. In a case where the number of the descending vehicles 6D is increased more than the number of the ascending vehicles 6U, the electric power control unit 10A displays an instruction to go to the descent RD on the manipulation panel in a case of the manned vehicle 6.

Moreover, the electric power control unit 10A can also set Pc≤Ps by reducing at least one of the power consumption of at least a part of the ascending vehicle 6U, the power consumption of at least a part of the descending vehicle 6D, and the power consumption of at least a part of the machine 7. For a scheme of reducing the power consumption of them, there are schemes of reducing the speed of the ascending vehicle 6U and stopping the machine 7 operating a task at a low priority. In the case of the manned vehicle 6, the electric power control unit 10A displays these instructions on the manipulation panel.

Furthermore, the motor 62 generates electric power in the descending vehicle 6D. However, all the electric power generated by the motors 62 is not supplied to the second power line 2 because the descending vehicle 6D drives auxiliary devices or drives an air conditioner. Thus, the electric power control unit 10A can also increase an amount that can be supplied from electric power generated by the motor 62 of the descending vehicle 6D to the second power line 2 by stopping unnecessary auxiliary devices, by reducing the power consumption of the air conditioner by changing the set temperature, or by stopping audio devices. In the case of the manned vehicle 6, the electric power control unit 10A displays these instructions on the manipulation panel. As described above, the electric power control unit 10A sets Pc≤Ps.

In a case where Pc>Ps is established, electric power for a shortage may be supplied from the storage device 3B of the power supply and storage apparatus 3. Moreover, in a case where the descending vehicle 60 includes the generator 64, the electric power control unit 10A may supply electric power for a shortage from the generator 64 by starting the internal combustion engine 63 of the descending vehicle 6U to drive the generator 64. Although it is difficult for the power plant 4 to meet a demand for a sudden output increase, the mine power management system 100 can make up electric power for a shortage using the power supply and storage apparatus 3 in its system or using the vehicle 6D including the generator 64. Thus, the mine power management system 100 can meet a sudden increase in power consumption that the power plant 4 cannot meet.

In Step S104, in a case where electric power allocation is controlled as Pc≤Ps, the electric power control unit 10A may reduce the power consumption of the machines 7, the ascending vehicles 6U, and the descending vehicles 6D in order of lower priority levels. This configuration is preferable because it can be avoided that the operation of one working on a task at a high priority level, that is, the operation of the ascending vehicle 6U traveling on the ascent RU with a load loaded or the operation of the machine 7 in mining, for example, is interrupted, or the operation speed of the ascending vehicle 6U and the operation speed of the machine 7 are reduced. Next, an example of control on electric power allocation to reduce power consumption in order of lower priority levels will be described.

Figure 6:
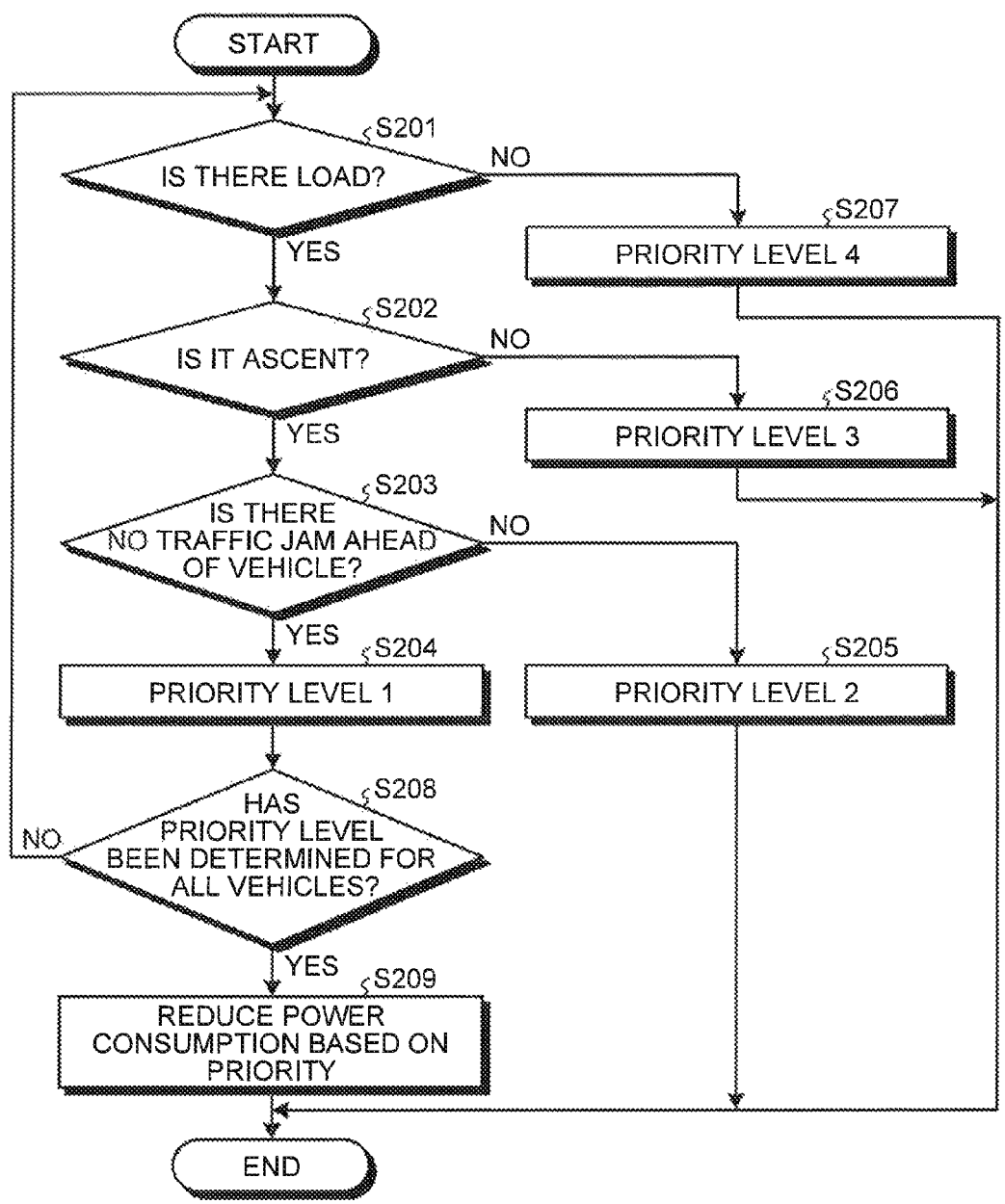
FIG. 6 is a flowchart of an example of control on electric power allocation in consideration of priority levels.

FIG. 6 is a flowchart of an example of control on electric power allocation in consideration of priority levels. The following description is an example in a case where a power line is also provided at some places on a flat area other than the ascent RU and the descent RD. In the control, electric power allocation is controlled in consideration of the priority levels of the operating vehicles 6. Thus, priority levels are determined for all the operating vehicles 6.

First, in Step S201, the electric power control unit 10A of the management apparatus 10 focuses an attention on a certain vehicle 6 among the operating vehicles 6, and determines whether the vehicle 6 on which the attention is focused is loaded with the load L. For example, in a case where the electric power control unit 10A obtains completion information from the machine 7 that the load L is loaded on the vehicle 6 on which the attention is focused, the electric power control unit 10A considers that the vehicle 6 on which the attention is focused is loaded with the load L (Yes in Step S201), and advances process to the Step S202. In a case where the electric power control unit 10A does not obtain completion information that the load L is loaded on the vehicle 6 on which the attention is focused, the electric power control unit 10A considers that the vehicle 6 on which the attention is focused is not loaded with the load L (No in Step S201).

In Step S202, the electric power control unit 10A determines whether the vehicle 6 on which the attention is focused is traveling on the ascent RU. For example, in a case where the electric power control unit 10A acquires the positional information about the vehicle 6 on which the attention is focused and detects that the vehicle 6 on which the attention is focused is moving in the direction of climbing up the ascent RU at a location corresponding to the ascent RU, the electric power control unit 10A considers that the vehicle 6 on which the attention is focused is traveling on the ascent RU (Yes in Step S202), and advances the process to Step S203. In a case where the vehicle 6 on which the attention is focused is not located at a location corresponding to the ascent RU, for example, the electric power control unit 10A considers that the vehicle 6 on which the attention is focused is not traveling on the ascent RU (No in Step S202).

In Step S203, the electric power control unit 10A determines whether there is a traffic jam ahead of the vehicle 6 on which the attention is focused. For example, the electric power control unit 10A grasps the state ahead of the vehicle 6 on which the attention is focused from information about the vehicle 6 on which the attention is focused and information (speed information and positional information) about the other vehicles 6 traveling on the ascent RU where the vehicle 6 on which the attention is focused is traveling on from the operation management unit 10C of the management apparatus 10. For example, in a case where the speeds of a plurality of the vehicles 6 traveling in the traveling direction ahead oil the vehicle 6 on which the attention is focused are a predetermined threshold (4 km/h, for example) or less, it is likely that a traffic jam occurs because the vehicles 6 are waiting to throw a load into the hopper P, for example. In this case, in the embodiment, it is considered that there is a traffic jam ahead of the vehicle 6 on which the attention is focused. In Step S203, in a case where there is no traffic jam in the traveling direction ahead of the vehicle 6 on which the attention is focused (Yes in Step S203), the electric power control unit 10A goes to Step S204, and sets the priority level of the vehicle 6 on which the attention is focused to one (the highest priority level). The vehicle 6 on which the attention is focused is traveling on the ascent RU with the load L loaded, and can reach the location of the hopper P without the influence of a traffic jam. Thus, the vehicle 6 at the level one is caused to throw the load L into the hopper P in priority, so that the operation rate of the vehicles 6 can be improved, and mine productivity can be improved.

Subsequently, returning to Step S203, in a case where there is a traffic jam in the traveling direction ahead of the vehicle 6 on which the attention is focused (No in Step S203), the electric power control unit 10A goes to Step S205. In Step S205, the electric power control unit 10A sets the priority level of the vehicle 6 on which the attention is focused to two (the second-highest priority level). In this case, this is because it is necessary for the vehicle 6 on which the attention is focused to secure some electric power because the vehicle 6 travels on the ascent RU with the load L loaded, although there is a traffic jam ahead of the vehicle 6.

Subsequently, returning to Step S202, in a case where the vehicle 6 on which the attention is focused is not traveling on the ascent RU (No in Step S202), the electric power control unit 10A goes to Step S206. In Step S206, the electric power control unit 10A sets the priority level of the vehicle 6 on which the attention is focused to three (the third-highest priority level). In this case, the vehicle 6 on which the attention is focused is traveling with the load L loaded, although the vehicle 6 is not traveling on the ascent RU.

Subsequently, returning to Step S201, in a case where the vehicle 6 on which the attention is focused is not loaded with the load L (No in Step S201), the electric power control unit 10A goes to Step S207. In Step S207, the electric power control unit 10A sets the priority level of the vehicle 6 on which the attention is focused to four (the fourth-highest priority level). In this case, it is likely that the vehicle 6 on which the attention is focused is traveling on the descent RD because the vehicle 6 is not loaded with the load L.

When the priority level of the vehicle 6 on which the attention is focused is determined from Step S201 to Step S207 described above, the electric power control unit 10A goes to Step S208, and determines whether the priority level is determined for all the operating vehicles 6. In a case where the priority level is not determined for all the operating vehicles 6 (No in Step S208), the electric power control unit 10A repeats Step S201 to Step S207 until the priority level is determined for all the operating vehicles 6. In a case where the priority level is determined for all the operating vehicles 6 (Yes in Step S208), the electric power control unit 10A goes to Step S209. The electric power control unit 10A then controls the electric power allocation individually for the operating vehicles 6 based on the determined priority levels. Namely, the electric power control unit 10A reduces power consumption in order of lower priority levels, that is, in order from the vehicle 6 at the priority level four. In the case of the manned vehicle 6, the electric power control unit 10A displays an instruction to reduce power consumption on the manipulation panel according to the priority levels. It is noted that in the embodiment, the priority levels are determined for the vehicles 6 to control electric power. This is similarly applied to the machines 7.

A scheme for determining the priority levels is not limited to the schemes described above. For example, the priority levels may be determined for the operating machines 7 or the operating vehicles 6 in descending order of power consumption, or the priority levels may be determined according to the importance of tasks. Moreover, the priority levels may be determined by taking into account of the remaining fuel amount of the vehicle 6, the distance between the vehicle 6 and refueling sites, and the information about the refueling sites. Furthermore, for control on electric power allocation in the embodiment, all the priority levels one to four described above may not be necessarily determined. Such a configuration may be possible in which at least one of the priority levels one to four is determined, or two or more of the priority levels one to four are determined in combination.

As described above, in the embodiment, in a case where a second power line is provided at a descent and a vehicle driven by a motor travels on the descent, electric power is generated using the motor as a generator, and electric power is recovered through the second power line. The recovered electric power is then supplied to a vehicle driven by a motor traveling on an ascent through a first power line provided at the ascent. With this configuration, kinetic energy in traveling on the descent, which is not used up to now, can be converted into electrical energy for use, so that power consumption can be suppressed by the amount from the viewpoint of all the machines and the vehicles used in the mine. As a result, the embodiment can suppress power consumption in the mine. Particularly, for the machines for use in the mine, electric power consumed and electric power obtained tend to be grasped because the vehicles travel on nearly determined routes and the vehicle, which once ascends, descends by almost the same distance. Thus, it can be said that the mine is an environment in which the potential energy of the descending vehicles is easily converted into electrical energy for use.

REFERENCE SIGNS LIST

1 FIRST POWER LINE
2 SECOND POWER LINE
3 POWER SUPPLY AND STORAGE APPARATUS
4 POWER PLANT
6 VEHICLE
6D DESCENDING VEHICLE
6U ASCENDING VEHICLE
6V VESSEL
6P CURRENT COLLECTOR
7, 7a, 7b MACHINE
8, 8a, 8b POWER SUPPLY RELAY VEHICLE
10 MANAGEMENT APPARATUS
10A ELECTRIC POWER CONTROL UNIT
10E ELECTRIC POWER BALANCE CALCULATION UNIT
10C OPERATION MANAGEMENT UNIT
10D COMMUNICATION CONTROL UNIT
11 COMMUNICATION DEVICE
12 WIRELESS COMMUNICATION ANTENNA
20, 20a, 20b POWER SUPPLY CABLE
21, 22 TRANSMISSION LINE
60 VEHICLE CONTROLLER
60A VEHICLE DRIVE CONTROL UNIT
60B VEHICLE ELECTRIC POWER CONTROL UNIT
60C VEHICLE STATE MANAGEMENT UNIT
60D VEHICLE POSITIONAL INFORMATION GENERATING UNIT
60E VEHICLE-SIDE COMMUNICATION CONTROL UNIT
61 WHEEL
62 MOTOR
63 INTERNAL COMBUSTION ENGINE
64 GENERATOR
65 MOTOR CONTROLLER
70 MACHINE CONTROLLER
70A MACHINE DRIVE CONTROL UNIT
70B MACHINE ELECTRIC POWER CONTROL UNIT
70C MACHINE STATE MANAGEMENT UNIT
70D MACHINE POSITIONAL INFORMATION GENERATING UNIT
70E MACHINE-SIDE COMMUNICATION CONTROL UNIT
71 MOTOR CONTROLLER
72 CRAWLER BELT
73 TRAVEL MOTOR
74 SWING MOTOR
75 HYDRAULIC PRESSURE GENERATION MOTOR
76 HYDRAULIC PUMP
100 MINE POWER MANAGEMENT SYSTEM

The invention claimed is:

1. A mine power management system comprising:
a first power line provided at an ascent and configured to exchange electric power with an ascending vehicle traveling on the ascent;
a second power line provided at a descent and configured to exchange electric power with a descending vehicle traveling on the descent;
a power supply and storage apparatus configured to exchange electric power at least between the first power line and the second power line; and
an electric power control unit configured to control electric power allocation at least among a machine, the ascending vehicle, and the descending vehicle so that a total electric power consumed by the machine, the ascending vehicle, and the descending vehicle that exchange electric power with the power supply and storage apparatus is equal to or less than a total electric power generated by the machine, the ascending vehicle, and the descending vehicle.

2. The mine power management system according to claim 1, wherein the electric power control unit controls the electric power allocation by adjusting allocation between the number of a plurality of the ascending vehicles and the number of a plurality of the descending vehicles.

3. The mine power management system according to claim 2, wherein a sum total of heights of a plurality of the ascents where the first power line is provided and a sum total of heights of a plurality of the descents where the second power line is provided are within ±10% with respect to an average value of the sum totals.

4. The mine power management system according to claim 2, wherein a sum total of heights of a plurality of the descents where the second power line is provided is greater than a sum total of heights of a plurality of the ascents where the first power line is provided.

5. The mine power management system according to claim 1, wherein when the total electric power consumed by the machine, the ascending vehicle, and the descending vehicle is greater than the total electric power generated by the machine, the ascending vehicle, and the descending vehicle, the electric power control unit reduces at least one of power consumption of at least a part of a plurality of the ascending vehicles, power consumption of at least a part of a plurality of the descending vehicles, and power consumption of at least a part of a plurality of the machines.

6. The mine power management system according to claim 5, wherein the electric power control unit reduces at least one of the power consumption of the machines, the power consumption of the ascending vehicles, and the power consumption of the descending vehicles in order of lower priority levels.

7. The mine power management system according to claim 6, wherein a sum total of heights of a plurality of the ascents where the first power line is provided and a sum total of heights of a plurality of the descents where the second power line is provided are within ±10% with respect to an average value of the sum totals.

8. The mine power management system according to claim 6, wherein a sum total of heights of a plurality of the descents where the second power line is provided is greater than a sum total of heights of a plurality of the ascents where the first power line is provided.

9. The mine power management system according to claim 5, wherein a sum total of heights of a plurality of the ascents where the first power line is provided and a sum total of heights of a plurality of the descents where the second power line is provided are within ±10% with respect to an average value of the sum totals.

10. The mine power management system according to claim 5, wherein a sum total of heights of a plurality of the descents where the second power line is provided is greater than a sum total of heights of a plurality of the ascents where the first power line is provided.

11. The mine power management system according to claim 1, wherein when the total electric power consumed by the machine, the ascending vehicle, and the descending vehicle is greater than the total electric power generated by the machine, the ascending vehicle, and the descending vehicle, the electric power control unit supplies a shortage in the electric power from the power supply and storage apparatus.

12. The mine power management system according to claim 11, wherein a sum total of heights of a plurality of the ascents where the first power line is provided and a sum total of heights of a plurality of the descents where the second power line is provided are within ±10% with respect to an average value of the sum totals.

13. The mine power management system according to claim 11, wherein a sum total of heights of a plurality of the descents where the second power line is provided is greater than a sum total of heights of a plurality of the ascents where the first power line is provided.

14. The mine power management system according to claim 1, wherein when the descending vehicle includes a generator, the electric power control unit supplies a shortage in the electric power from the generator of the descending vehicle when the total electric power consumed by the machine, the ascending vehicle, and the descending vehicle is greater than the total electric power generated by the machine, the ascending vehicle, and the descending vehicle.

15. The mine power management system according to claim 14, wherein a sum total of heights of a plurality of the ascents where the first power line is provided and a sum total of heights of a plurality of the descents where the second power line is provided are within ±10% with respect to an average value of the sum totals.

16. The mine power management system according to claim 14, wherein a sum total of heights of a plurality of the descents where the second power line is provided is greater than a sum total of heights of a plurality of the ascents where the first power line is provided.

17. The mine power management system according to claim 1, wherein a sum total of heights of a plurality of the ascents where the first power line is provided and a sum total of heights of a plurality of the descents where the second power line is provided are within ±10% with respect to an average value of the sum totals.

18. The mine power management system according to claim 1, wherein a sum total of heights of a plurality of the descents where the second power line is provided is greater than a sum total of heights of a plurality of the ascents where the first power line is provided.

19. A mine power management system comprising:
a first power line provided at an ascent and configured to exchange electric power with an ascending vehicle traveling on the ascent;
a second power line provided at a descent and configured to exchange electric power with a descending vehicle traveling on the descent; and
a power supply and storage apparatus configured to exchange electric power at least between the first power line and the second power line,
wherein a sum total of heights of a plurality of the ascents where the first power line is provided and a sum total of heights of a plurality of the descents where the second power line is provided are within ±10% with respect to an average value of the sum totals.

20. A mine power management system comprising:
a first power line provided at an ascent and configured to exchange electric power with an ascending vehicle traveling on the ascent;
a second power line provided at a descent and configured to exchange electric power with a descending vehicle traveling on the descent; and
a power supply and storage apparatus configured to exchange electric power at least between the first power line and the second power line,
wherein a sum total of heights of a plurality of the descents where the second power line is provided is greater than a sum total of heights of a plurality of the ascents where the first power line is provided.

* * * * *